United States Patent [19]

Horiki et al.

[11] Patent Number: 4,943,179
[45] Date of Patent: Jul. 24, 1990

[54] PLATE MEMBER ARRANGEMENT

[75] Inventors: Yoshio Horiki, Matsusaka; Hideo Ikeda, Tokyo, both of Japan

[73] Assignee: Central Glass Company, Limited, Ube, Japan

[21] Appl. No.: 66,710

[22] Filed: Jun. 24, 1987

[30] Foreign Application Priority Data

Jun. 27, 1986 [JP] Japan ............................. 61-97580[U]
Jun. 27, 1986 [JP] Japan ............................. 61-97581[U]
Jun. 30, 1986 [JP] Japan ............................. 61-99147[U]

[51] Int. Cl.⁵ ............................................. B25G 3/34
[52] U.S. Cl. .................................... 403/269; 403/267; 403/404; 249/83
[58] Field of Search ............... 403/267, 269, 266, 265, 403/404; 249/83; 30/343

[56] References Cited

U.S. PATENT DOCUMENTS

| 231,392 | 8/1880 | Bramhall | 30/343 X |
|---|---|---|---|
| 3,476,496 | 11/1969 | Golden | 403/267 X |
| 4,147,443 | 4/1979 | Skobel | 403/267 |

FOREIGN PATENT DOCUMENTS

| 0046208 | 2/1982 | European Pat. Off. |
|---|---|---|
| 1989584 | 7/1968 | Fed. Rep. of Germany . |
| 7204183 | 2/1972 | Fed. Rep. of Germany . |
| 2831715 | 1/1980 | Fed. Rep. of Germany . |
| 3429732 | 2/1986 | Fed. Rep. of Germany . |
| 53-25931 | 7/1978 | Japan . |
| 53-145216 | 12/1978 | Japan . |
| 58-21769 | 5/1983 | Japan . |
| 61-186619 | 11/1986 | Japan . |
| 443626 | 2/1968 | Switzerland . |
| 2046821 | 11/1980 | United Kingdom . |
| 2095317 | 9/1982 | United Kingdom . |
| 2115470 | 9/1983 | United Kingdom . |

Primary Examiner—Andrew V. Kundrat
Attorney, Agent, or Firm—Fleit, Jacobson, Cohn, Price, Holman & Stern

[57] ABSTRACT

A movable window glass arrangement in use for a window of an automobile, made up of a plate glass a part of which is inserted in an injection-molded plastic holder member. The plate glass is formed at its bottom peripheral section with projections which project into the plastic holder member, thereby accomplishing secure connection between the plate glass and the holder member without using adhesive or metallic fastening members.

12 Claims, 4 Drawing Sheets

FIG.13
FIG.14 FIG.15
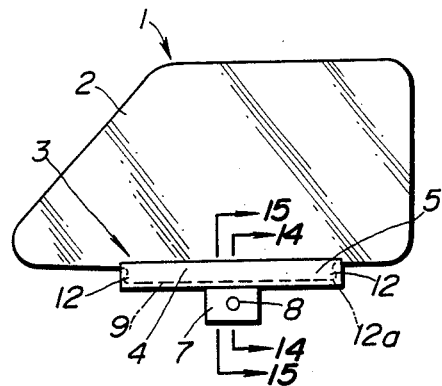
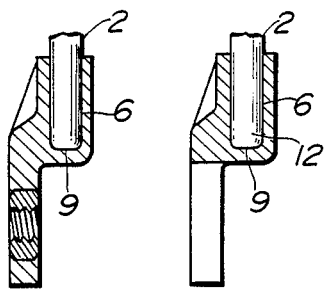
FIG.16
FIG.17
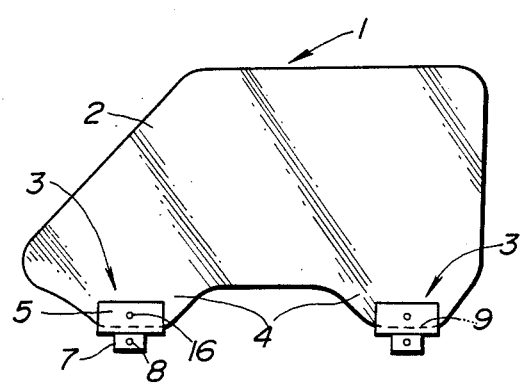
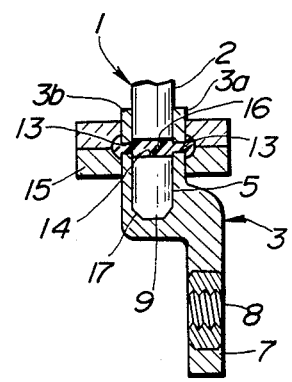

PLATE MEMBER ARRANGEMENT

BACKGROUND OF THE INVENTION

1. Field of the Invention

The present invention relates to a plate member arrangement used for windows and doors and including a plate member such as glass plate or plastic plate which is flat or curved and raw or tempered, and more particularly to such a plate member arrangement including a holder member secured to the plate member and used for a vertically movable window glass arrangement for vehicles and automobiles.

2. Description of the Prior Art

In connection with movable window glass for automobiles, a glass plate is fitted with and secured to a separately formed metallic or plastic holder member by means of adhesion with adhesive or adhesive tape serving as a damping member, or by fastening with metallic rod members passing through holes formed in the glass plate and the holder member.

In the former case of securing upon adhesion, the holder must be provided with projections for preventing protrusion of adhesive and with fine unevenness for enhancing adhesive force, thereby unavoidably complicating the shape of the holde member. Additionally, a relatively long time is required to dry and solidify the adhesive during a process for bonding the holder member with the glass plate with the adhesive, in which the curvature of the glass plate and the holder member becomes out of order. This deteriorates smooth movement of the glass plate after installation as the vertically movable window glass for an automobile, thereby increasing rejected articles. Even if any reinforcing means for adhesive force is provided on the side of the holder member, there is a possibility of causing peeling-off, separation and the like due to adhesive deterioration throughout a long time use.

In the latter case of secuting with the metallic rod members, the glass plate is formed with the holes and therefore is unavoidably lowered itself in strength. Additionally, fastening is usually accomplished by means of a screw-thread and consequently stress may generate around the hole of the glass plate. This will lead to breakage of the glass plate.

In addition, recently window glass is in a tendency of being enlarged in size and made thin. For example in connecion with window glass for automobile, there are a tendency of increasing hardtop type and sashless type automobiles from view points of weight-lightening and good appearance, in which a greater force is unavaoidably applied to a fixing section of a guide channel for the movable plate glass. Furthermore, a tendency of aiming high quality is now predominant, so that it is desired to effectively use a space inside a door frame in order to dispose therein various accessories or to cause a door inner panel to have a variety of functions. However, the above-discussed conventional window glass arrangements unnecessarily meet such a recent trend of the window glass for automobiles, because of the complicated and large-sized construction of the window glass arrangements and of weakness of the same arrangements in connecting strength between the glass plate and the holder member and in liability of breakage.

SUMMARY OF THE INVENTION

A plate member arrangement of the present invention is comprised of a plate member at least a part of which is holded by a holder member. The plate member and the holder member are securely connected with each other by means of a projecting member which projects from the side of the plate member and extends into the holder member. The projecting member is in direct contact with the plate member and with the holder member, and independent from the holder member.

Accordingly, the direct contact of the projecting member with the plate member and the holder member achieves a strong and secure connection between the plate member and the holder member without using adhesive or metallic connecting members, thereby making the arrangement simple in construction and facilitating production of the same while overcoming difficulties due to usage of the adhesive and the metallic connecting members. Additionally, such a secure connection is high in connecting strength and durability and therefore the plate member arrangement with such a secure connection can meet various requirements according to recent trend.

BRIEF DESCRIPTION OF THE DRAWINGS

The feature and advantages of the plate member arrangement according to the present invention will be more clearly appreciated from the following description taken in conjunction with the accompanying drawings in which like reference numerals corresponding elements, in which:

FIG. 13 is a front view similar to FIG. 10 but showing a fifth embodiment of the plate member arrangement according to the present invention;

FIG. 14 is an enlarged sectional view taken in the direction of arrows substantially along the line 14—14 of FIG. 13;

FIG. 15 is an enlarged sectional view similar to FIG. 14 but taken in the direction of arrows substantially along the line 15—15 of FIG. 13;

FIG. 16 is a front view of a sixth embodiment of the plate member arrangement according to the present invention;

FIG. 17 is an enlarged fragmentary sectional view showing an essential part of the arrangement of FIG. 16 and a method for forming a rod-like member connecting member and a holder member;

DETAILED DESCRIPTION OF THE INVENTION

Figure 1:
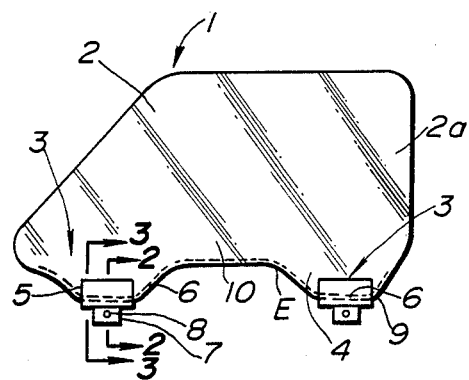
FIG. 1 is a front view of a first embodiment of a plate member, arrangement according to the present invention.
Figures 2, 3:
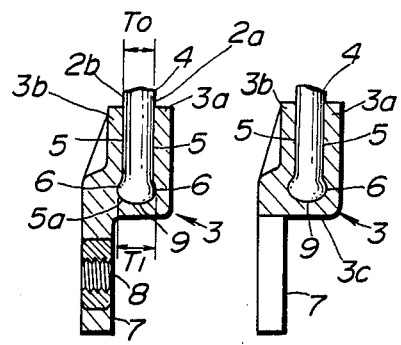
FIG. 2 is an enlarged sectional view taken in the direction of arrows substantially along the line 2—2 of FIG. 1.
FIG. 3 is an enlarged sectional view similar to FIG. 2 but taken in the direction of arrows substantially along the line 3—3 of FIG. 1.

Referring now to FIGS. 1 to 3, there is shown a first embodiment of a plate member arrangement 1 according to the present invention. The plate member arrangement 1 is comprised of a plate member 2 which is, in this embodiment, a window glass for an automotive vehicle. The plate member or window glass 2 is, in this embodiment, adapted to be moved upwardly to close a window and downwardly to open the window in accordance with operation of a vehicle occupant. The plate member 2 of this embodiment is formed of a flat plate glass and generally in the trapezoidal shape to be fitted in the shape of the window. The plate member 2 is integrally formed with two downwardly protruding parts 4, 4 which are located spaced from each other thereby to form a curved bottom peripheral section 10 having a curved bottom edge E. Curved linear projections 6 are formed on the front and reverse sides 2a, 2b of the bottom peripheral section 10 so as to project outwardly. Thus, the bottom peripheral portions 5 of each downwardly protruding part 4 forms part of the bottom peripheral section 10 and is formed at its edge portion 5a into the circular shape in cross-section as best shown in FIGS. 2 and 3. As clearly indicated in FIG. 2, the thickness $T_1$ of the edge portion 5a is larger than the thickness $T_0$ of a major part of the plate member 4. As seen, the edge surface 9 of the bottom peripheral portion 5 forms part of the edge portion 5a and formed rounded.

Two holder members 3, 3 are disposed to cover the bottom peripheral portions 5, 5 of the downwardly projecting sections 4, 4, respectively. Each holder member 3 is made of plastic or resin and molded integrally with the plate member 2 in such a manner that the bottom peripheral section 5 becomes embedded in the molded holder member 3. In other words, the bottom peripheral section 5 is embedded in the molded holder member 3, so that the front and reverse sides 2a, 2b and the bottom peripheral edge portion 5a are integrally covered with the molded plastic. Thus, the holder member 3 has a holding section (no numeral) which is U-shaped in cross-section as shown in FIGS. 2 and 3 and includes front and reverse wall sections 3a, 3b which are parallel with and spaced from each other so that the bottom peripheral portion 5 of the protruding part 4 is put between the side wall sections 3a, 3b. The side wall sections 3a, 3b are integrally connected at their bottom parts with each other with a bottom wall section 3c. Accordingly, the front and reverse side wall sections 3a, 3b are respectively in contact with the front and reverse sides 2a, 2b of the plate member bottom peripheral portion 5, while the bottom wall section 3c is in contact with the edge surface 9 of the bottom peripheral portion 5. It will be understood that the outwardly extending projections 6 securely engage with the holder member 3 and therefore the plate member 2 is securely prevented from coming out from the holder member 3. A tongue like section 7 is integrally formed with the holding section of the holder member 3 so that the holder member 3 as a whole is T-shaped in plan as viewed in FIG. 1. The tongue-like section 7 is provided with a rigid member formed with a threaded hole 8 through which the holder member 3 is connected to a guide channel (not shown) or the like through which the holder member 3 is connected to a driving mechanism (not shown) for driving the plate member 2 upwardly and downwardly upon operation of the vehicle occupant.

The above-mentioned projections 6 are preferably formed at the edge portion 5a of the bottom peripheral portion 5 of the plate member as discussed above. However, it will be understood that the projection 6 or projections may be formed at one or both of side peripheral sections of the plate member 2 or at a top peripheral section of the plate member 2 in accordance with an ascent and descent manner and an opening and closing manner of the plate member 2.

Although the two holder members 3, 3 have been shown and described as being molded to hold the plate member 2, it will be appreciated that more than two holder members or a single holder member may be used. Such a selection depends on balance between the size of the plate member 2 and the above-mentioned ascent-descent and opening-closing manners of the plate member 2, and on weight, shape and the like of the plate member 2.

The linear projections 6 at the bottom peripheral portion 5 of the plate member 2 is formed by heating the bottom peripheral edge portion 5a to a fluid temperature of the plate member 2 (for example, glass plate) at which the plate member has fluidity, so that the bottom peripheral edge portion 5a has a generally uniform annular cross-section along the length thereof. Such heating is accomplished, for example, by passing electric current through a pair of electrodes between which the plate member is located, a gas burner, or a far infra-red radiation arrangement, or optionally a raser.

The holder member 3 is so formed that the bottom peripheral portion 5 becomes embedded therein during plastic-injection molding of the holder in situ such a RIM (reaction injection molding), R-RIM (reinforced reaction injection molding), LIM (liquid injection molding), and R-RIM (reinforced liquid injection molding). Of these injection moldings, R-RIM and R-LIM are preferable. Examples of plastic or resin for the holder member 3 are polyurethane, polyacetal, nylon 6, nylon 66, polyester, PBT (polybutylene terephtalate), epoxy resin and the like, and thermosetting resins. Optionally, thermoplastic rubbers such as polyoleffine rubber, polyurethane rubber, ethylene-vinyl acetate rubber and the like are also used as the material of the holder member 3. Additionally, as reinforcement material for the plastic or resin, inorganic fiber such as glass fiber or organic fiber such as aramid fiber are preferably used. Such fiber is known per se and usually used for the same purpose.

Molding the holder member 3 is accomplished by using a mold (not shown) made up of a plurality of mold segment parts. The mold may be formed with a plurality of resin supply inlet holes so that resin is sufficiently fed into a cavity of the mold. Additionally, in the molding, fluororesin, silicone resin, silicone rubber and the like may be used as a sealing and damping material for tightly closing the mold segment parts.

A variety of glass plates and plastic plates are mainly used for the plate member 2. Examples of the glass plates are flat plate glass, curved glass plate, tempered glass plate, laminated glass plate, insulating glass unit heat-reflecting glass plate, and coated glass plate. Examples of the plastic plate are acrylic resin plate, polycarbonate plate and the like which are hard-coating treated. Such glass plates and plastic plates are usually used for architecture, furniture, vehicle, automobile and the like.

Although the bottom edge of each holder member 3 has been shown as being in the shape of a horizontal straight line, in cross-section, perpendicular to a direction in which a force for upwardly and downwardly driving the plate member 2 acts, it may be of the shape formed by combination of a horizontal linear line and an oblique line or of the curved shape, in cross-section.

Thus, the above-discussed plate member arrangement offers the following advantages:

Securing connection between the plate member 2 and the holder member 3 is sufficiently durable against shearing force acting to the securing surface between the plate member and the holder member when the plate member makes its ascent and descent movements, because of hooking effect of the bulged bottom peripheral edge portion 5a of the plate member against the holder member 3 in addition to increased securing and contacting surface area between the plate member and the holder member owing to integral molding in such a manner that the bottom peripheral section 5 of the plate member downwardly protruding part 4 is inserted in the holder member 3. Consequently, a further secure connection can be obtained between the plate member 2 and the holder member 3 as compared with a conventional connection therebetween made by mere adhesion and another conventional connection therebetween made by integral molding in a manner that a part of a flat plate member is inserted into a holder member. Furthermore, adhesion operation as in the former conventional connection is not required, and secure connection between the plate member and the holder member is momentarily accomplished in molding. This prevents the curvature and the like of the plate member and the holder member from getting out of order which is encountered in the former conventional connection. Moreover, molding and installation of the holder member are simultaneously achieved, thereby reducing the number of production operations and rendering adhesive unnecessary. In addition, such a further secure connection between the plate member and the holder member makes possible to render the plate member arrangement light in weight, small-sized and thin in thickness as compared with the conventional connections therebetween. This makes possible the above-discussed plate member arrangement to be used for a variety of purposes, for example, window glass for automotive vehicle, architectural window glass and door glass, glass door for furniture and personal effects.

Figure 4:
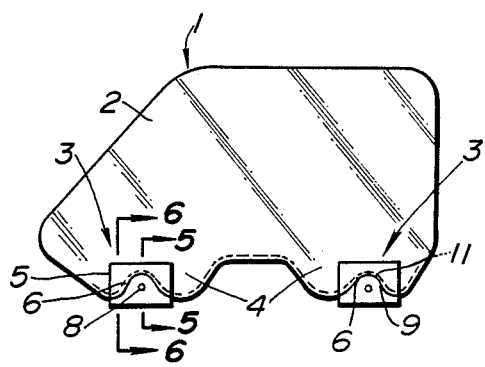
FIG. 4 is a front view similar to FIG. 1 but showing a second embodiment of the plate member arrangement, according to the present invention.
Figures 5, 6:
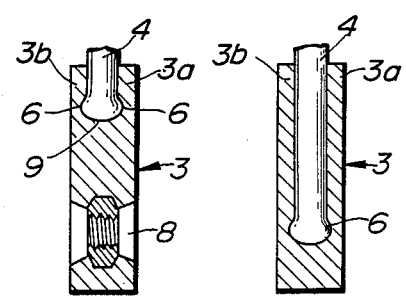
FIG. 5 is an enlarged sectional view taken in the direction of arrows substantially along the line 5—5 of FIG. 2.
FIG. 6 is an enlarged sectional view similar to FIG. 5 but taken in the direction of arrows substantially along the line 6—6 of FIG. 4.

FIGS. 4 to 6 illustrate a second embodiment of the plate member arrangement in accordance with the present invention, which is similar to the first embodiment of FIGS. 1 to 3 with the exception that each downwardly protruding part 4 is formed with an upward depression 11. Accordingly, the bottom peripheral edge portion 5a of the bottom peripheral section 5 is curved along the edge surface 9 defined by the depression 11. The curved linear projections 6 are formed on the front and reserve sides of the bottom peripheral portion 5 and along the curved edge surface 9. The holder member 3 is molded in such a manner that the bottom peripheral portion 5 of each protruding part 4 is inserted in the resin forming the hold member 3, so that the projections 6 are embedded in the holder member 3 thereby ensuring secure engagement between the plate member 2 and the holder member 3. The threaded hole 8 is formed at a central part of the holder member 3 which part corresponds to the depression 11 of the protruding part 4. Such location of the threaded hole 8 achieves further rigid fixation of the plate member 2 with the holder member 3, thereby leading to making the plate member arrangement 1 small-sized, light in weight and thin in thickness.

Figure 7:
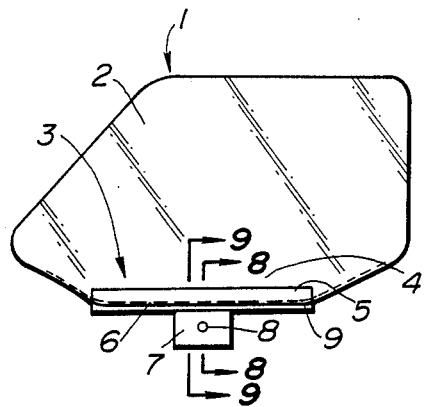
FIG. 7 is a front view of a third embodiment of the plate member arrangement according to the present invention.
Figures 8, 9:
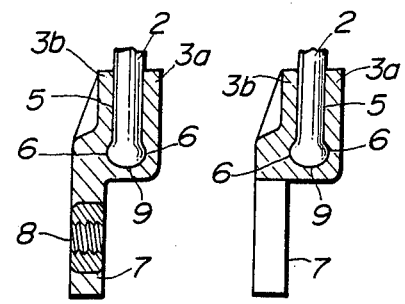
FIG. 8 is an enlarged sectional view taken in the direction of arrows substantially along the line 8—8 of FIG. 7.
FIG. 9 is an enlarged sectional view similar to FIG. 8 but taken in the direction of arrows substantially along the line 9—9 of FIG. 7.

FIGS. 7 to 9 illustrate a third embodiment of the plate member arrangement according to the present invention, which is similar to the first embodiment with the exception that the plate member 2 is formed with the single downwardly protruding part 4 which laterally extends. In this embodiment, the linear projections 6 are formed on the opposite sides of the bottom peripheral portion 5 along the bottom peripheral edge surface 9 thereby to form the outwardly bulged bottom peripheral edge portion 5a. The laterally elongate holder member 3 is integrally molded to be formed in such a manner the bottom peripheral section 5 of the protruding part 4 is inserted into the holder member 3. The holder member 3 is provided with the tongue-like member 7 formed with the threaded hole 8.

Figure 10:
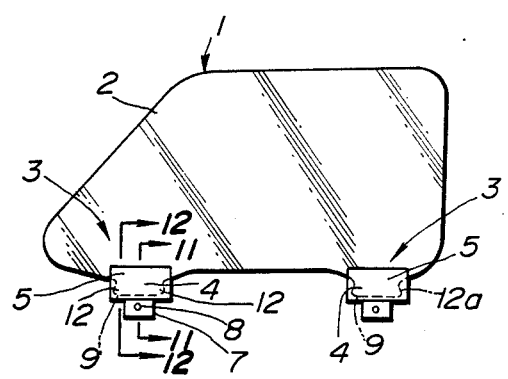
FIG. 10 is a front view of a fourth embodiment of the plate member arrangement according to the present invention.
Figures 11, 12:
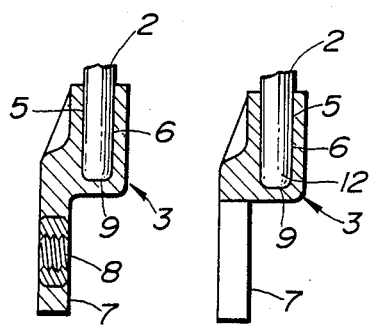
FIG. 11 is an enlarged sectional view taken in the direction of arrows substantially along the line 11—11 of FIG. 10.
FIG. 12 is an enlarged sectional view similar to FIG. 11 but taken in the direction substantially along the line 12—12 of FIG. 10.

FIGS. 10 to 12 illustrate a fourth embodiment of the plate member arrangement according to the present invention, which is similar to the first embodiment of FIGS. 1 to 3 except for the shape of the downwardly protruding parts 4 integrally formed as a part of the plate member 2. In this embodiment, each downwardly protruding part 4 is integrally formed with two laterally protruding projections 12, 12 which laterally outwardly protrude thereby to form oppositely located lateral edge surfaces 12a each of which is S-shaped in plan as shown in FIG. 10. Additionally, the holder member 3 is formed to cover the downwardly protruding part 4 by being integrally molded in such a manner that each downwardly protruding part 4 is inserted in the resin material of the holder member 3. As clearly shown in FIG. 12, the front and reverse sides of each projection 12 are respectively flush with the front and reverse sides of the downwardly protruding part, and also with the front and reverse sides of the main body of the plate member 2. Accordingly, the S-shaped lateral edges surfaces 12a of the downwardly protruding part 4 is embedded in the holder member 3, so that secure connection can be obtained between the plate member 2 and the holder member 3, preventing the downwardly protruding part 4 from coming off from the holder member 3.

FIGS. 13 to 15 illustrate a fifth embodiment of the plate member arrangement according to the present invention, which is similar to the fourth embodiment with the exception that a single laterally elongate downwardly protruding part 4 is interally formed as a part of the plate membe 2. The protruding part 4 is formed with the two laterally protruding projections 12, 12 which laterally outwardly protrude thereby to form the oppositely located lateral edge surfaces 12a. Additionally, the laterally elongate holder member 3 is integrally formed to cover the downwardly protruding part 4 so that the opposite lateral edge surfaces 12a are embedded in the holder member 3.

FIGS. 16 and 17 illustrate a sixth embodiment of the plate member arrangement according to the present invention, which is similar to the first embodiment of FIGS. 1 to 3. In this embodiment, each holder member 3 is made of plastic or resin and molded independently from the plate member 2. The holder member 3 includes the holding section which is U-shaped in cross-section and has the front and reverse side wall sections 3a, 3b. The side wall sections 3a, 3b are formed with through-holes 13, 13, respectively, which are located at corresponding positions. Additionally, each downwardly protruding part 4 is formed at its central portion with a through-hole 14. The holder member 3 is bonded to the plate member 2 with adhesive 17 in such a manner that the major part of the downwardly protruding part 4 is fixedly put between the side wall sections 3a, 3b and that the through-hole 14 of the downwardly protruding part 4 coincides with the through-holes 12, 13 of the side wall sections 3a, 3b. Then, a mold 15 is constructed of separatable mold segments and set through a sealing material to tightly contact with the outer surface of the holder member side wall sections 3a, 3b, in which resin is poured into the through-holes 13, 14 through a pouring opening (not shown) leading to the through-holes 13, 14 and formed at a location at which the separatable mold segments of the mold 15 contact with each other. After solidification of the resin, the plate member 2 with the holder member 3 is removed from the mold 15. At this time, the solidified resin forms a pin-like plastic member 16 which passes through the holder member through-holes 13 and the plate member through-hole 14 as clearly shown in FIG. 17, thereby establishing secure connection between the holder member 3 and the plate member 2. The pin-like plastic member 16 is preferably so formed as to be provided at its opposite ends with enlarged heads (no numerals) as shown in FIG. 17 in order that the holder member 3 is slightly pressed at its outer surfaces with the enlarged heads.

With respect to the number and the size of the through-holes formed in the holder member 3 and the plate member 2, they may be selectable taking account of preventing strength-lowering of the plate member 2 and reinforcing durability of the adhesive. The shape of the through-holes of the holder member 3 and the plate member 2 may be unnecessarily the same.

The pin-like plastic member 16 may be molded by the same injection-molding methods and with the same plastic or resin as in the first embodiment. Additionally, in molding, the same sealing and damping material as in the first embodiment may be used. The mold 15 may be formed with a plurality of pouring openings to enhance effective filling of the resin into the through-holes 13, 14 of the holder member 3 and the plate member 2.

Figure 18:
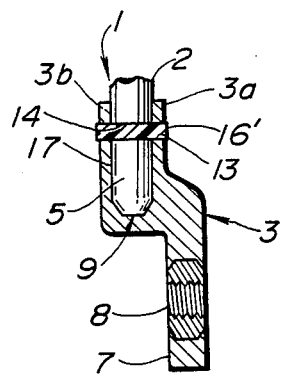
FIG. 18 is an enlarged sectional view similar to FIG. 17 but showing a seventh embodiment of the plate member arrangement according to the present invention.
Figure 19:
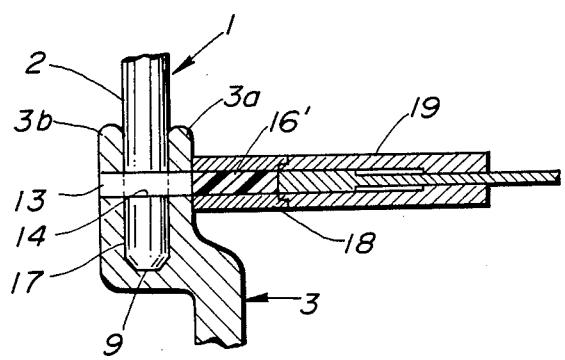
FIG. 19 is an enlarged fragmentary sectional view showing a method of providing a rod-like member connecting a plate membe and a holder member.

FIG. 18 illustrates a seventh embodiment of the plate member arrangement according to the present invention, similar to the sixth embodiment. In this embodiment, an independently formed pin-like member 16' is tightly inserted into the through-holes 13, 14 of the holder member 3 and the plate member 2, in which the holder member 3 is bonded to the plate member 2 with the silicone resin adhesive 17. The pin-like member 16' is preferably made of plastic or resin which may be the same as of the pin-like member 16 in the sixth embodiment. Such insertion of the pin-like member 16' is accomplished in the following manner as illustrated in FIG. 19: The pin-like member 16' is inserted into a setting adapter member 18 attached to the tip end of a cylinder 19. Then, the setting adapter member 18 is so set that its tip end contacts with the outer surface of the holder member 3 and that the pin-like member 16' will be inserted into the through-holes 13, 14. Thereafter, piston action of the cylinder 19 is made to cause the rod-like member 16' to be pushed into the through-holes 13, 14 of the holder member 3 and the plate member 2.

What is claimed is:

1. A plate member arrangement comprising:
   a glass plate member;
   a holder member contacting with said plate member to securely hold a peripheral part of said plate member, said holder member being made of plastic and being molded to cover said part of said plate member;
   means for securely connecting said plate member with said holder member, said means including a projecting member which directly projects from said plate member outwardly into said holder member, said projecting member being independent from said holder member, said projecting member being integral with said part of said plate member and providing a hook-like connection with said holder member, said plate being integrally formed with a protruding part, said protruding part being integral with said projecting member.

2. A plate member arrangement as claimed in claim 1, wherein said projecting member includes first and second linear projections which project respectively from surfaces on opposite sides of said plate member to form a bulged peripheral edge portion whose thickness is larger than that of a major part of said plate member.

3. A plate member arrangement as claimed in claim 1, wherein said projecting member is substantially coplanar with said plate member.

4. A plate member arrangement as claimed in claim 3, wherein said plate member includes first and second projecting members which protrude oppositely to form opposite curved edge surfaces.

5. A plate member arrangement as claimed in claim 1, wherein said plate member is a movable vehicle window and said projecting member projects from said plate member generally in a direction perpendicular to a direction of movement of said plate member.

6. A plate member arrangement as claimed in claim 1, wherein said holder member is molded by injection molding.

7. A plate member arrangement as claimed in claim 1, wherein said holder member includes means through which said holder member is mechanically connected with a driving device for driving said plate member.

8. A plate member arrangement as claimed in claim 1, wherein said plate member is made of a material selected from the group consisting of glass and plastic.

9. A vehicle window glass and holder assembly wherein the window glass has an integral peripheral projection and the holder is a plastic molding surrounding a part of the glass which includes the projection, the projection providing a hook-like connection with the holder, said window glass being integrally formed with a protruding part, said protruding part being integral with said projection.

10. An assembly as defined in claim 9 wherein the projection extends laterally from the glass.

11. An assembly as defined in claim 9 wherein the projection extends in the plane of the glass.

12. A glass plate member and holder assembly comprising:

a plate member made of glass and integrally formed at its peripheral part with a projecting section projecting outwardly from said plate member; and a holder member made of plastic and molded to cover said peripheral part of said plate member to securely hold said plate member peripheral part including said plate member projecting section, said projecting section projecting into said holder member to provide a hook-like connection with said holder member said plate member being integrally formed with a protruding part, said protruding part being integral with said projecting member.

* * * * *